(12) United States Patent
Baur et al.

(10) Patent No.: US 8,373,969 B2
(45) Date of Patent: Feb. 12, 2013

(54) ENERGY STORAGE SYSTEM WITH A PROTECTIVE DEVICE THAT CHEMICALLY BINDS DECOMPOSITION PRODUCTS OF A SOLVENT OF AN ELECTRIC COMPONENT

(75) Inventors: Frank Baur, Nürnberg (DE); Carsten Götte, Großberg (DE)

(73) Assignee: Continental Automotive GmbH, Hannover (DE)

( * ) Notice: Subject to any disclaimer, the term of this patent is extended or adjusted under 35 U.S.C. 154(b) by 382 days.

(21) Appl. No.: 12/676,106

(22) PCT Filed: Aug. 27, 2008

(86) PCT No.: PCT/EP2008/061178
§ 371 (c)(1),
(2), (4) Date: Mar. 2, 2010

(87) PCT Pub. No.: WO2009/030611
PCT Pub. Date: Mar. 12, 2009

(65) Prior Publication Data
US 2010/0202101 A1    Aug. 12, 2010

(30) Foreign Application Priority Data
Sep. 5, 2007 (DE) .................. 10 2007 042 085

(51) Int. Cl.
*H01G 9/00* (2006.01)
*H01M 10/34* (2006.01)
*H01M 10/52* (2006.01)

(52) U.S. Cl. .......................................... 361/502; 429/57

(58) Field of Classification Search .................. 361/502;
429/64, 57, 61
See application file for complete search history.

(56) References Cited

U.S. PATENT DOCUMENTS

| | | | |
|---|---|---|---|
| 3,464,860 A * | 9/1969 | Kreidl et al. ................... 429/57 |
| 3,470,024 A * | 9/1969 | Kreidl et al. ................... 429/57 |
| 3,553,017 A * | 1/1971 | Morrill ......................... 429/57 |
| 3,911,080 A | 10/1975 | Mehl et al. |
| 4,184,007 A | 1/1980 | Urry |
| 4,269,905 A | 5/1981 | Wedlake |
| 4,590,541 A * | 5/1986 | Takahashi et al. ............ 361/527 |
| 6,093,503 A * | 7/2000 | Isoyama et al. ................ 429/61 |
| 6,599,656 B2 * | 7/2003 | Cittanova ....................... 429/61 |
| 7,041,412 B2 * | 5/2006 | Ishida et al. .................... 429/57 |
| 7,160,368 B1 * | 1/2007 | Wakelin ........................ 96/132 |
| 7,279,682 B2 * | 10/2007 | Ouvrier-Buffet et al. . 250/338.1 |
| 7,663,865 B2 | 2/2010 | Toia et al. |
| 7,776,465 B1 | 8/2010 | Hatazawa et al. |
| 8,081,417 B2 * | 12/2011 | Toia et al. ..................... 361/523 |
| 2001/0055712 A1 | 12/2001 | Cittanova |
| 2005/0053831 A1 | 3/2005 | Katzenberger et al. |

(Continued)

FOREIGN PATENT DOCUMENTS
DE    2623618 B1    11/1977
DE    3241555 A1 *    5/1984

(Continued)

*Primary Examiner* — David M Sinclair
(74) *Attorney, Agent, or Firm* — Laurence A. Greenberg; Werner H. Stemer; Ralph E. Locher

(57) ABSTRACT

An energy storage system includes an electric component, a solvent, and a protective device which chemically binds the decomposition products of the solvent. Any damage to the surroundings, which could be caused by the decomposition products of the solvent, can be prevented using the novel energy storage system.

19 Claims, 4 Drawing Sheets

U.S. PATENT DOCUMENTS

| | | | |
|---|---|---|---|
| 2006/0097701 A1 | 5/2006 | Kodama et al. | |
| 2007/0146965 A1 | 6/2007 | Mitchell et al. | |
| 2008/0003491 A1* | 1/2008 | Yahnker et al. | 429/62 |
| 2008/0310079 A1 | 12/2008 | Toia et al. | |
| 2009/0225496 A1 | 9/2009 | Toia et al. | |

FOREIGN PATENT DOCUMENTS

| | | |
|---|---|---|
| DE | 10128672 A1 | 12/2002 |
| DE | 10157272 A1 | 6/2003 |
| DE | 10340973 A1 | 3/2005 |
| DE | 102005007607 A1 | 8/2006 |
| DE | 102005041604 A1 | 3/2007 |
| EP | 1107336 A2 | 6/2001 |
| EP | 1168479 A1 | 1/2002 |
| EP | 1598893 A1 | 11/2005 |
| WO | 03092088 A2 | 11/2003 |
| WO | 2006088021 A1 | 8/2006 |
| WO | 2007066372 A2 | 6/2007 |
| WO | 2007080614 A1 | 7/2007 |
| WO | 2007107137 A1 | 9/2007 |

* cited by examiner

ENERGY STORAGE SYSTEM WITH A PROTECTIVE DEVICE THAT CHEMICALLY BINDS DECOMPOSITION PRODUCTS OF A SOLVENT OF AN ELECTRIC COMPONENT

BACKGROUND OF THE INVENTION

Field of the Invention

The invention relates to energy storage system containing an electric component, a housing and a protective device.

Electric components, such as dual-layer capacitors for example, feature solvents which can be problematic for the safety of people and for the environment. Above all, in the event of the electric component sustaining damage, these solvents or decomposition products of these solvents can get into the environment. To avoid this it is necessary to prevent these hazardous substances escaping into the environment.

BRIEF SUMMARY OF THE INVENTION

The object of the invention is to provide an energy storage system that avoids the escape of decomposition products of solvents which present a hazard to people and the environment.

This object is achieved by an energy storage system according to recited in the independent claim. Further developments of the energy storage system are the subject matter of further claims.

An energy storage system in accordance with one embodiment comprises an electric component with at least one solvent, a housing which encloses the component within an interior and a protective device which chemically binds the decomposition products of the at least one solvent of the electric component. The presence of a protective device next to the electric component enables any decomposition products of the at least one solvent that may be released to be bound and/or collected. A release of decomposition products of the solvent can be possible for example if the energy storage system is damaged. Possible instances of damage are for example mechanical damage to the energy storage system, an electrical defect which triggers a short circuit for example, an overload as a result of defective charge regulation or thermal overheating caused by a fire for example.

In an undamaged energy storage system there is no contact between the solvent which the electric component features and the housing, since the electric component is surrounded by an envelope preventing the solvent from flowing out into the interior. Thus an undamaged energy storage system features an interior containing no decomposition products of the solvent.

Such an energy storage system can for example be usefully employed in the automotive area. In the event of damage, for example a road traffic accident, any decomposition products of the solvent can be bound in the electric component and retained. This protects passengers and the environment against possible dangers from the decomposition products. Such an energy storage system makes it possible to use a solvent in the electric component without any danger.

The energy storage system can additionally have a protective facility comprising a coating of the housing. The housing can feature an inner side facing towards the electric component on which the coating is present. If a decomposition product of the at least one solvent gets out of the electric component into the interior it is chemically bound to the inner side of the housing by the protective facility, the coating. Especially in the event of damage which leads to the housing being damaged, this avoids decomposition products of the solvent getting into the environment. An outflow of decomposition products from the damaged housing is completely or largely avoided.

The housing can be stable in shape, deformable and impact-resistant. Acrylonitrile butadiene styrene (ABS) is one possible material for such a housing for example.

In one embodiment the solvent in the electric component can comprise acetonitrile. The solvent can also include further organic solvents, for example methanol. Furthermore the electric component can also comprise electrolyte solutions based on aqueous systems, which for example feature KOH or $H_2SO_4$ in water. Decomposition products which can arise from the solvent, especially from acetonitrile, include compounds containing cyanide, such as for example hydrocyanic acid HCN. Hydrocyanic acid is a poisonous gas which should be prevented from escaping into the environment. The decomposition products can also feature other hazardous compounds which are to be prevented from escaping from the electric component.

The coating on the inside of the housing can feature chemical compounds for binding the decomposition products of the at least one solvent. Such chemical compounds for binding the decomposition products can involve compounds selected from a group comprising Fe(II) compounds, Fe(III) compounds, Cu(II) compounds, Ag(I) compounds and organic compounds. For example the compounds can include silver nitrate $AgNO_3$, iron hydroxides $Fe(OH)_2$ or $Fe(OH)_3$, copper chloride $CuCl_2$ or hemoglobin derivatives. The coating can feature the chemical compounds alone or in a matrix, for example in a binding agent.

A possible chemical compound for binding the decomposition products of the solvent can for example involve iron hydroxide $Fe(OH)_2$. In a reaction with hydrocyanic acid HCN, stable complex iron(II) cyanides form in accordance with the following reaction equation:

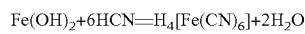
$$Fe(OH)_2 + 6HCN = H_4[Fe(CN)_6] + 2H_2O$$

The complex iron cyanides are few or nonvolatile and thereby not damaging to the environment or people. A further example of chemical compounds which bind hydrocyanic acids is silver nitrate $AGNO_3$, which reacts with the hydrocyanic acids to form an acid-stable precipitate of silver cyanide.

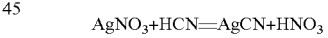
$$AgNO_3 + HCN = AgCN + HNO_3$$

In addition further complexing agents are suitable for use as a chemical compound to bind the decomposition products of the solvent, which form stable, nonvolatile compounds with the decomposition products.

If $CuCl_2$ is used as a chemical compound to bind the decomposition products of the solvent, it first forms $Cu(CN)_2/Cu(CN)$ with a CN surplus and the $[Cu(CN)_4]_{3-}$, which is especially stable.

In such an energy storage system the electric component can comprise a dual-layer capacitor. In dual-layer capacitors a solvent is used for the electrolyte solution which can comprise acetonitrile. However other electric components which are suitable for energy storage also be suitable.

In a further embodiment the energy storage system can comprise a protective device featuring an electronic sensor and a container and chemical compounds are present in the container for binding the decomposition products of the at least one solvent. In such cases the sensor is coupled electrically to a closure of the container. The sensor can be selected from a group which includes pressure sensors for detection of pressure and/or vibration and chemical sensors for detection of decomposition products of the at least one solvent. Thus the sensor can send a signal to the closure of the container as soon as the energy storage system is vibrated, subjected to pressure or decomposition products of the at least one solvent are released and detected within the housing. An activation of the closure of the container can comprise the opening of the container. The sensor is arranged on the housing, for example on the inside of the housing or on the outside of the housing. The container can also be arranged in the interior of the housing or on the housing, with there being a connection between the interior of the housing and the closure of the housing. There is thus a connection between the chemical compounds for binding the decomposition products to be found within the container and the interior of the housing. Also present in the container can be a gas for generating an overpressure in the container compared to the interior of the housing. This gas can typically comprise $CO_2$. The chemical compound for binding the decomposition products can be present in the container as a granulate. The container can for example comprise a cartridge in which the gas and the chemical compound are present.

In a further embodiment the chemical compound can be introduced by means of the gas into the space when the closure of the container is opened. The sensor activates the closure of the container, which opens on detection of a signal by the sensor. The gas located in the container and the chemical compound for binding the decomposition products of the solvent can thus be transferred into the interior of the housing since there is an overpressure in the container compared to in the interior. The chemical compounds bind the decomposition products of the solvent escaping from the electric component in the interior of the housing. The gas used for introducing the compound can additionally suppress a generation of flames if necessary and cool down the interior and thereby protect against overheating. The sensor can furthermore also be activated mechanically, in order if necessary, for example during fitting or removal of the energy storage system, to prevent an escape of the decomposition products of the solvent.

In a further embodiment a facility is present on the housing for equalizing the pressure between the interior of the housing and the surroundings of the energy storage system. Such a facility can comprise a predetermined breaking point in the housing which creates an opening in the housing for controlled equalization of the pressure in the event of overpressure. Such a predetermined breaking point can for example comprise a rupture disc which ruptures if the pressure in the interior becomes too great, or a valve element which releases the overpressure into the surroundings in a controlled manner. This avoids the overall housing being damaged on introduction of the gas and the chemical compounds from the container into the interior and too great an overpressure in the interior of the housing leading to an explosive destruction of the housing.

In a further embodiment the energy storage system can comprise a protective device which includes a container and an electronic sensor. The container features an activatable facility for collecting the reaction products between the chemical compounds and the decomposition products of the at least one solvent inside the container, and the facility is activated electronically by the sensor. An activation of this facility by the sensor generates a vacuum in the container. Furthermore the activation can include an increase of the volume of the facility for collecting the reaction products. The closure of the container can further comprise a valve for sucking out the decomposition products of the solvent from the interior of the housing into the container. In the event of damage the sensor initiates the enlargement of the volume of the facility for collecting the reaction products and an opening of the valve. This produces a vacuum which makes sure that the decomposition products of the solvent escaping from the electric component are sucked through the valve out of the interior of the housing into the inside of the container. There they can react with chemical compounds for binding the decomposition products, the reaction products then collect in the device.

The invention will be explained in greater detail on the basis of the figures:

DESCRIPTION OF THE INVENTION

Figure 1:
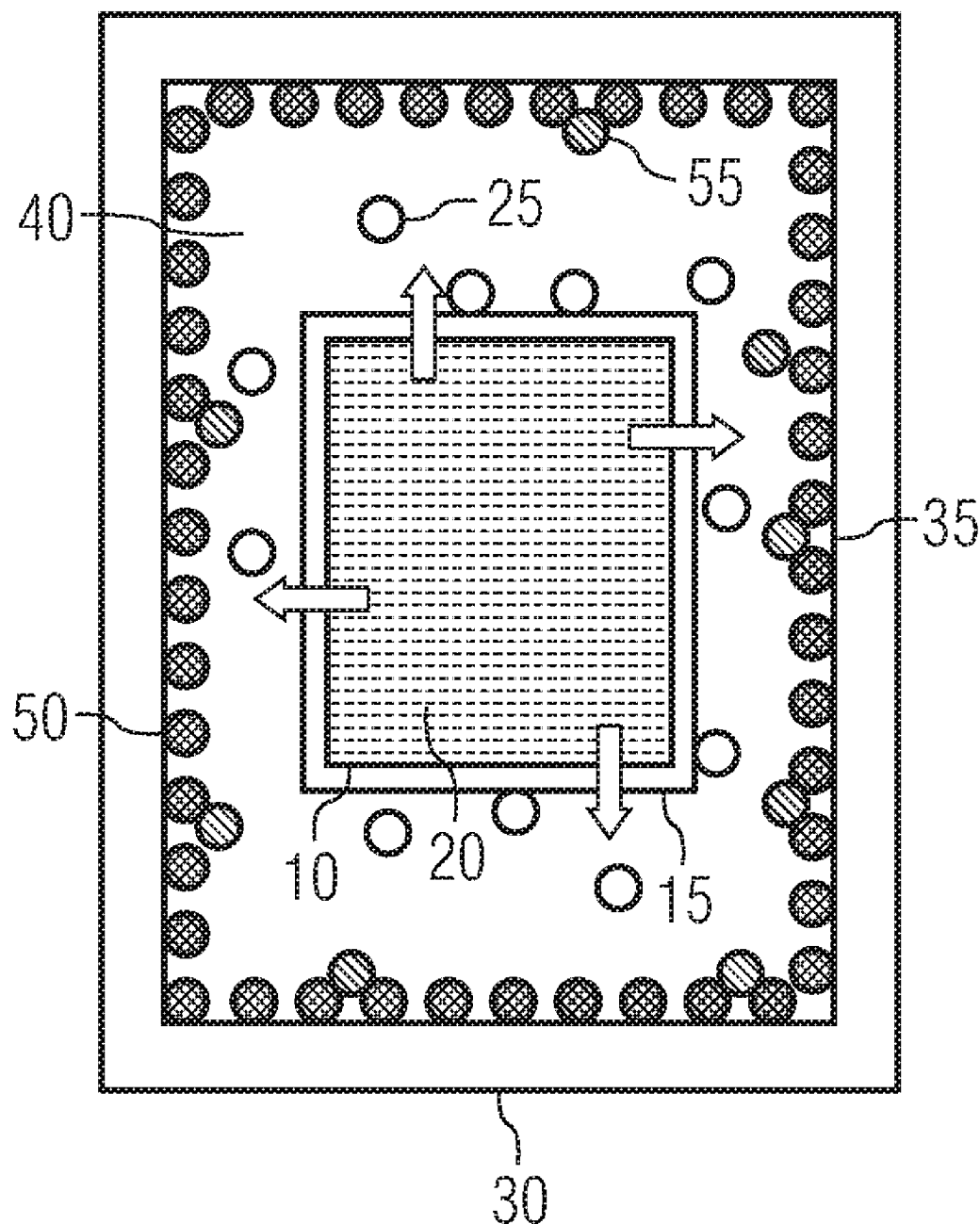
FIG. 1 shows a schematic side view of an embodiment of the energy storage system with a coating.

FIG. 1 shows the schematic side view of an exemplary embodiment of the energy storage system. The electric component 10 containing a solvent 20, for example acetonitrile, is located in the interior 40 of the housing 30. The electric component is surrounded by an envelope 15 which separates the solvent from the inside of the housing. The housing has an inner side 35 facing towards the electric component. On the inner side of the housing there is a coating which consists of the chemical compound 50 for binding the decomposition products. The coating can also contain a matrix, for example a binding agent, in which the chemical compounds 50 are to be found. Decomposition products 25 of the solvent 20, especially gaseous decomposition products, can escape from the electric component 10, for example if the energy storage system is damaged or vibrated, a process which is indicated schematically by the arrows on the electric component. As soon as the decomposition products 25 of the solvent 20 reach the inside 35 of the housing, they are bound there by the chemical compounds 50. The decomposition products 25 can typically involve decomposition products of acetonitrile, for example hydrocyanic acids HCN. The chemical compounds 50 can typically include Fe(II) compounds, Fe(III) compounds, Cu(II) compounds, Ag(I) compounds and organic compounds. For example the compounds can include silver nitrate $AgNO_3$, iron hydroxide $Fe(OH)_2$ or $Fe(OH)_3$, copper chloride $CuCl_2$ or hemoglobin derivatives. When the decomposition products react with the chemical compounds complexes that are stable and nonvolatile are produced as reaction products 55 so that they are not hazardous to the environment. Even in the event of damage to the housing 30 (not shown here), this means that no hazardous products can escape from the housing.

Figure 2:
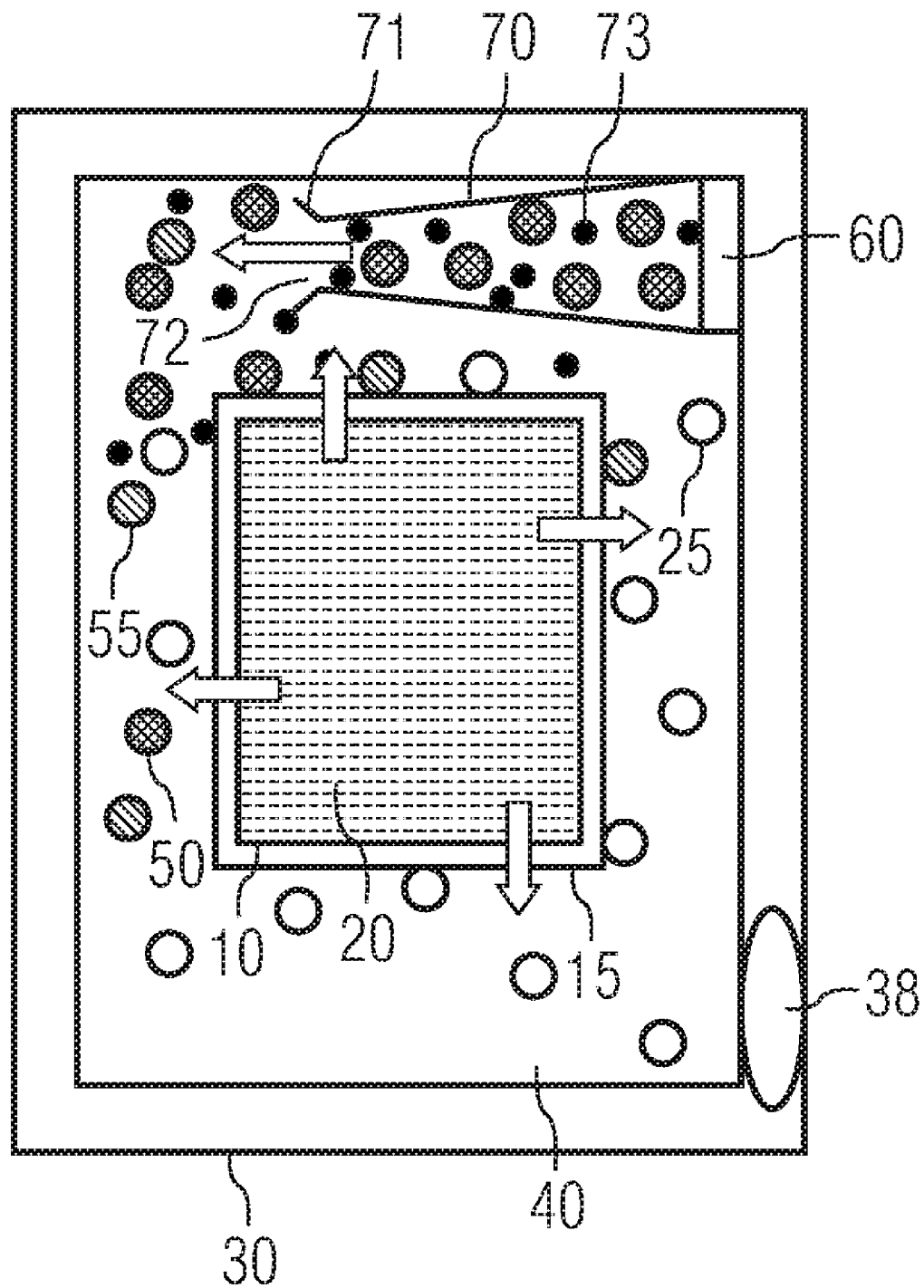
FIG. 2 shows a schematic side view of a further embodiment with a sensor and a container.

FIG. 2 shows a further exemplary embodiment of the energy storage system in a schematic side view. The figure again shows the electric component 10 with the envelope 15 which contains a solvent 20, in the interior 40 of the housing 30. Decomposition products 25 of the solvent 20 can typically escape from the electric component in the event of damage, a process which is schematically indicated by arrows. A sensor 60 and a container 70 are also located in the housing. The sensor 60 and the container 70 can also be located outside the housing 30. The closure 71 of the container 70 is then however still connected to the interior 40 of the housing 30 (not shown here). The sensor is connected electronically with the closure 71 of the opening 72 of the container 70 and in the event of pressure, vibration or detection of the decomposition products 25 of the solvent 20, can activate the closure such that the container 70 is opened. In the container, which can be a cartridge for example, there is the chemical compound 50, typically in the form of a granulate, which can bind the decomposition products 25 of the solvent 20, as well as a gas, for example CO2, which ensures that there is an overpressure in the container compared to the interior 40 of the housing. If the container 70 is opened, the chemical compounds 50 and a gas 73 can escape from the container 70, which is indicated in the diagram by an arrow. As soon as the chemical compounds 50 are in the interior 40, they can bind the decomposition products escaping from the electric component 10. The reaction products 55 are stable and nonvolatile. Because a greater pressure arises in the interior on introduction of the gas 73 and the chemical compound 50 into the interior 40, a facility for pressure equalization 38 continues to the present which comprises a predetermined breaking point in the housing and which regulates the pressure in the interior should the pressure become too great. Such a facility can comprise a rupture disk which ruptures in the event of overpressure or a valve element. The pressure can be reduced in a controlled manner by the valve element and damage to the housing avoided. Because the decomposition products 25 of the solvent 20, for example hydrocyanic acids, are bound by the chemical compound 50, they are harmless and do not cause any damage to the environment.

Figure 3:
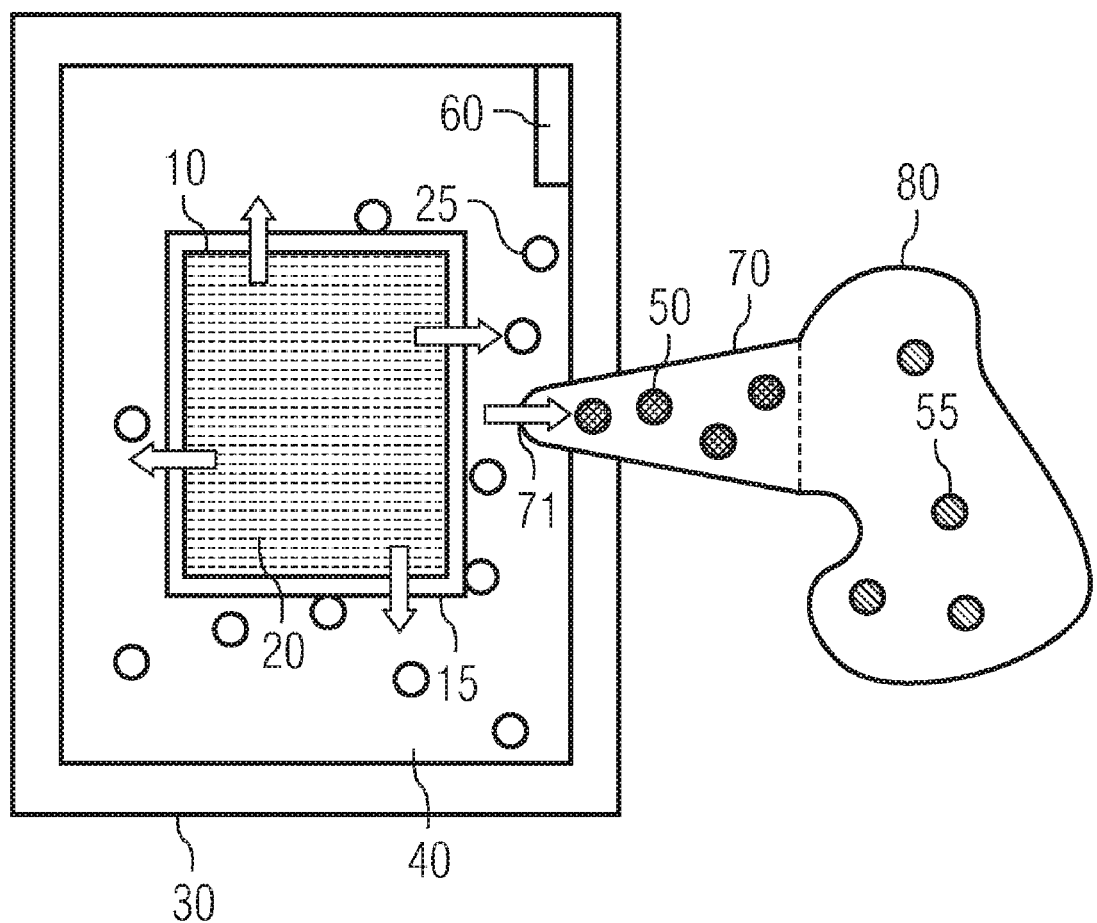
FIG. 3 shows a further embodiment in a schematic side view with a facility for collection and a container.

FIG. 3 shows a further embodiment of the energy storage system. The electric component 10 with the envelope 15 is located in the interior 40 of the housing 30. The electric component, for example the dual-layer capacitor, can contain a solvent 20, of for example acetonitrile. In the event of damage, decomposition products 25 of the solvent, for example hydrocyanic acids, can escape from the electric component into the interior 40 of the housing 30. The housing 30 also includes an electronic sensor 60 which is connected to an activatable facility 80 suitable for collecting the reaction products 55 from the reaction of the decomposition products 25 with the chemical compounds 50. The activatable facility 80 is located on the container 70, of which the closure 71 includes the valve. The chemical compounds 50 for binding the decomposition products 25 of the solvent 20 are located in the container 70. In the event of damage, when the sensor 60 detects pressure, shaking or the decomposition products 25 of the solvent 20, the activatable facility 80 for collecting the reaction products 25 is activated, meaning that the volume of this facility increases and thus a vacuum is created in the container. The decomposition products 25 of the solvent 20 escaping from the electric component 10 are sucked through the closure 71 into the container 70 where they can react with the chemical compound 50 which is typically present as a granulate in the container 70. The bound reaction products 55, i.e. those which have been rendered harmless, are collected in the facility 80.

Figure 4:
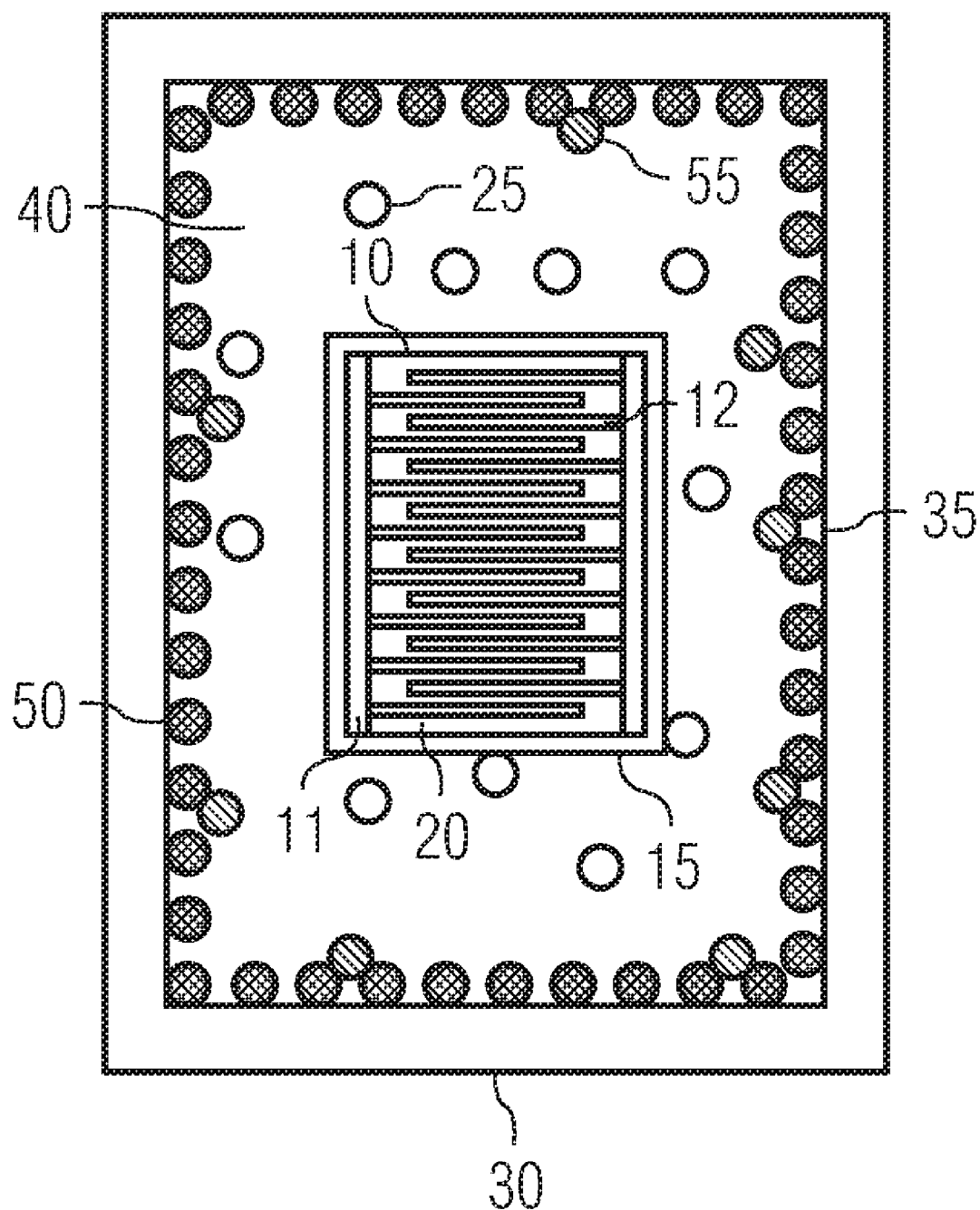
FIG. 4, like FIG. 1, shows the schematic side view of an exemplary embodiment of the energy storage system with a coating and a dual-layer capacitor as the electric component.

Like FIG. 1, FIG. 4 shows a schematic side view of an embodiment, with the electric component 10 being a dual-layer capacitor. The embodiments shown in FIGS. 2 and 3 can also comprise such a dual-layer capacitor as an electric component. The dual-layer capacitor is enclosed by the envelope 15 and has contacts 11 as well as electrodes 12. Not shown in this figure are the lines to the electric terminals outside the housing via which the electric component is supplied with power for its operation. The solvent 20 together with the electrolytes dissolved within it (not shown here) surrounds the electrodes.

The examples and exemplary embodiments shown in FIGS. 1 through 4 can be varied in any given way. It should also be taken into account that the invention is not restricted to these examples but allows further developments not discussed here.

The invention claimed is:

1. An energy storage system, comprising
an electric component having at least one solvent producing decomposition products;
a housing having an interior, said housing enclosing said component in said interior; and
a protective device configured to chemically bind the decomposition products of said at least one solvent;
said protective device including an electronic sensor, a container with an opening communicating with said interior of said housing, and a closure closing said opening, said container storing chemical compounds for binding the decomposition products of said at least one solvent, said sensor being electrically coupled to said closure of said container; and
said container storing a gas for creating overpressure in said container relative to the interior of said housing such that said gas forces said chemical compounds from said container into said housing due to an opening of said closure.

2. The energy storage system according to claim 1, wherein said protective device comprises a coating of said housing.

3. The energy storage system according to claim 2, wherein said housing has an inner wall facing towards said electric component, and said coating is disposed on said inner wall.

4. The energy storage system according to claim 2, wherein said coating includes chemical compounds for binding the decomposition products of said at least one solvent.

5. The energy storage system according to claim 4, wherein said chemical compounds for binding the decomposition products of said at least one solvent are selected from a group consisting of Fe(II) compounds, Fe(III) compounds, Cu(II) compounds, Ag(I) compounds, and organic compounds.

6. The energy storage system according to claim 1, wherein said electronic sensor is at least one sensor selected from the group consisting of pressure sensors for detection of pressure and vibration and chemical sensors for detection of decomposition products of said at least one solvent.

7. The energy storage system according to claim 1, wherein said sensor is disposed on said housing.

8. The energy storage system according to claim 1, wherein said container is disposed in the interior of said housing.

9. The energy storage system according to claim 1, wherein said container is disposed on said housing.

10. The energy storage system according to claim 1, wherein said gas is $CO_2$.

11. The energy storage system according to claim 1, wherein said chemical compounds are introduced into the interior by means of said gas when said closure of said container is opened.

12. The energy storage system according to claim 1, which further comprises a pressure equalization device for equalizing a pressure between the interior of said housing and the surroundings of the energy storage system disposed on said housing.

13. The energy storage system according to claim 12, wherein said pressure equalization device comprises a predetermined breaking point in said housing which, on an occurrence of overpressure in said housing, creates an opening in said housing for controlled equalization of the pressure in said interior of said housing.

14. The energy storage system according to claim 1, wherein said at least one solvent comprises acetonitrile.

15. The energy storage system according to claim 1, wherein said decomposition products of the solvent comprise compounds containing cyanide.

16. The energy storage system according to claim 1, wherein said electric component is a dual-layer capacitor.

17. An energy storage system, comprising
   an electric component having at least one solvent producing decomposition products;
   a housing having an interior, said housing enclosing said component in said interior; and
   a protective device configured to chemically bind the decomposition products of said at least one solvent;
   wherein said protective device includes an electronic sensor, a container with a closure, and chemical compounds for binding the decomposition products of said at least one solvent contained in said container;
   wherein said sensor is electrically coupled to said closure of said container;
   wherein said container includes an activatable device for collecting the reaction products between the chemical compounds and the decomposition products of said at least one solvent;
   wherein an activation of said activatable device is linked electronically to said electronic sensor; and
   wherein the activation of said activatable device includes an increase in a volume of said activatable device, for collecting the reaction products.

18. The energy storage system according to claim 17, wherein said closure of said container includes a valve for aspirating the decomposition products of the solvent from said interior into said container.

19. The energy storage system according to claim 17, wherein the activation of said activatable device generates a vacuum in the container.

* * * * *